Patented July 22, 1952

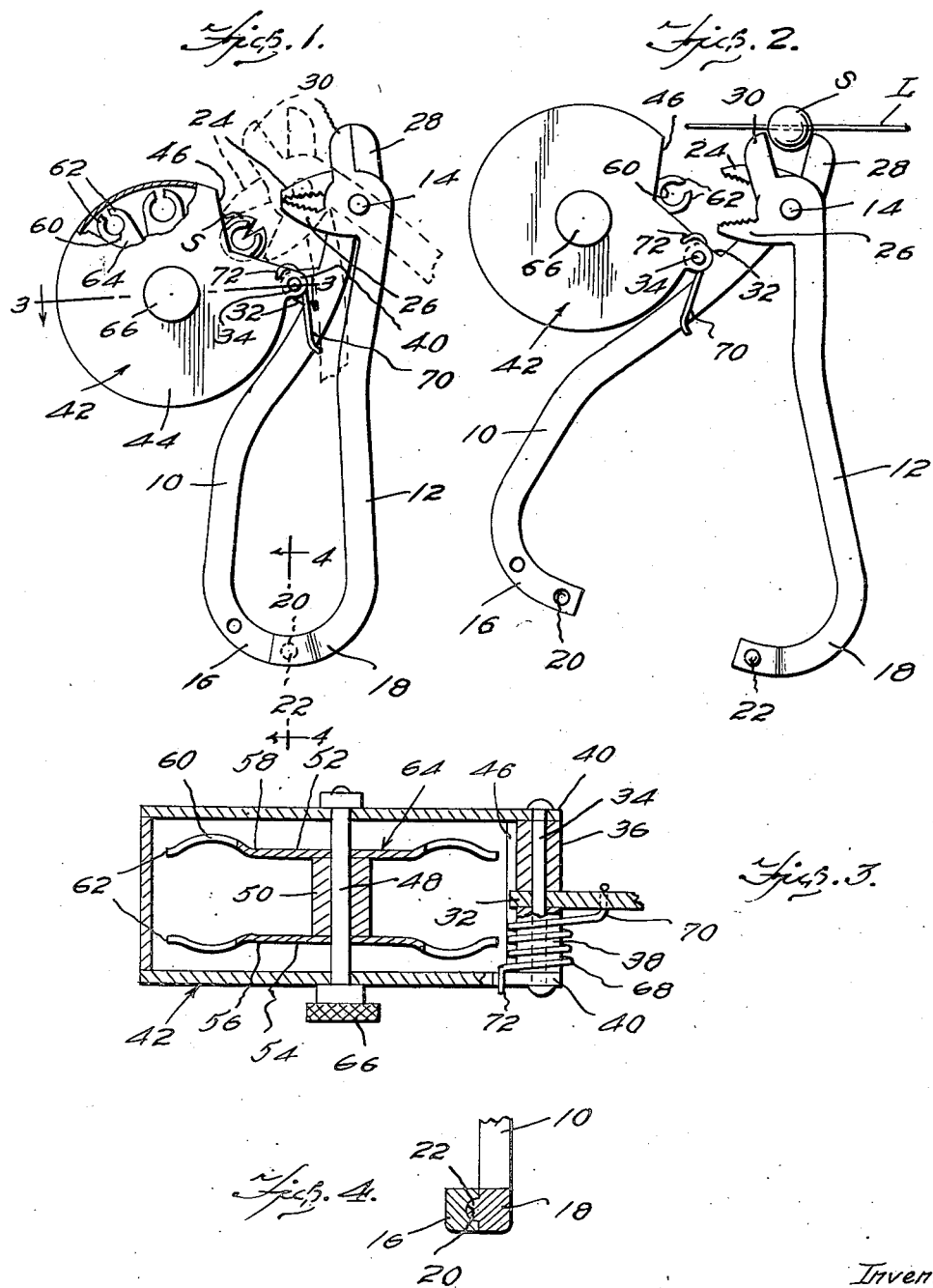

2,603,992

UNITED STATES PATENT OFFICE 2,603,992

INSTRUMENT FOR CLOSING AND OPENING SPLIT SINKERS ON FISHING LINES

Russell G. Brown and Kenneth E. Brown, Montague, Mich.

Application May 9, 1950, Serial No. 160,914

5 Claims. (Cl. 81—15)

This invention relates to an instrument for closing and opening a split sinker on a fishing line and has for its primary object to facilitate the rapid clinching of a split sinker on a fishing line.

Another object is to facilitate the opening of a clinched sinker so that the fishing line to which the sinker is attached may be readily removed from the split in the sinker.

A further object is to support a group of split sinkers near the clinching jaws of the instrument for presentation one at a time to the jaws for clinching about a fishing line, and means yieldingly to move the sinker supporting means away from a clinched sinker held in the jaws to automatically remove it from the sinker supporting means.

Still another object is to support a group of sinkers of different sizes for selective presentation of one of the sinkers to the clinching jaws.

The above and other objects may be attained by employing this invention which embodies among its features a pair of crossed handles pivotally connected together for arcuate movement, a pair of cooperating clinching jaws carried by the handles and projecting laterally therefrom adjacent the pivot, and a pair of cooperating sinker opening jaws extending longitudinally from the handle.

Other features include a magazine pivotally connected to the handle on the side of the instrument from which the clinching jaws project, said magazine being movable in an arc toward or away from the jaws, means within the magazine to support a group of split sinkers therein for presentation one at a time between the clinching jaws, and yielding means on the handle and engaging the magazine for moving said magazine away from the jaws whereby a clinched sinker will be automatically extracted from the magazine while held between the jaws.

In the drawings:

Figure 1 is a side view of an instrument for closing and opening a split sinker on a fishing line, embodying the features of this invention;

Figure 2 is a view similar to Figure 1 showing the device in use for opening a split sinker carried by a fishing line;

Figure 3 is a transverse sectional view taken substantially along the line 3—3 of Figure 1; and Figure 4 is a sectional view taken substantially along the line 4—4 of Figure 1.

Referring to the drawings in detail this improved instrument comprises a pair of crossed handles 10 and 12 which are pivotally coupled together adjacent one end of the instrument by a suitable pivot pin 14. The ends of the handles remote from the pivot pin are curved inwardly as at 16 and 18 respectively, and formed in the curved portion 16 of the handle 10 is a recess 20 for the reception of a latching boss 22 carried by the curved portion 18 of the handle 12, so that when the curved portions 16 and 18 are overlapped the handles 10 and 12 will be releasably held together. Carried on the handle 10 and projecting laterally therefrom adjacent the pivot 14 is a clinching jaw 24 which cooperates with a similar clinching jaw 26 carried by the handle 12 adjacent the pivot 14. It is to be noted that the clinching jaws 24 and 26 project laterally from the instrument and in the preferred form the adjacent faces of the clinching jaws 24 and 26 are knurled or milled. Extending longitudinally from the handle 10 at the end thereof adjacent the pivot 14 is a blade shaped slit opening jaw 28 and a similar cooperating blade shaped slit opening jaw 30 projects longitudinally from the handle 12 adjacent the pivot 14 and the adjacent edges of the jaws 28 and 30 are made relatively thin and the jaws are bent to cause the adjacent thin edges to align when they are closed.

Projecting laterally from the handle 10 is an ear 32 in which is supported a transversely extending pivot pin 34 and surrounding the pivot pin on opposite sides of the ear 32 are spacing tubes 36 and 38. Pivotally mounted on the pin 34 and abutting the outer ends of the tubes 36 and 38 are ears 40 carried by a magazine designated generally 42. The magazine comprises a substantially circular cylindrical case 44 having a notch 46 in its periphery, the deepest part of which aligns with the space between the jaws 24 and 26 when the magazine is moved on the pivot pin 34 toward the jaws. Extending axially through the magazine for rotation with relation thereto is an axle shaft 48 to which is attached intermediate its ends a hub 50. This hub carries on opposite sides spaced parallel disks 52 and 54 each of which is formed at its periphery with aligning outstanding fingers 56 and 58. These fingers lie along axes which radiate from the axis of the shaft 48 and each is provided adjacent its outer end with a recess 60 which opens outwardly through the ends of the fingers to form yielding grips 62 so that a sinker entered into the carriage 64 formed by the hub 50 and the disks 52 and 54 will be releasably held between the fingers 56 and 58. One end of the shaft 48 projects beyond the side of the case 44 to the exterior thereof and carries a knob 66 by which the carriage 64 may be rotated within the case 44.

In order to extract a clinched sinker held in the jaws 24 and 26, a coil spring 68 encircles the spacing tube 38, and one end 70 of said spring is anchored around the handle 10, while the opposite end 72 of said spring engages an ear 40 of the magazine 42 so that when the magazine is moved about the pivot 34 toward the clinching jaws 24 and 26, the spring will be tensioned and the magazine urged to move in a reversed direction.

In use split sinkers S are inserted in the carriage 64 between the fingers 56 and 58 so as to rest in the recesses 60 of a finger 56 as illustrated in Figure 1, with the V-shaped split V extending outwardly and in substantial registration with the outer ends of the openings 60. with the magazine thus loaded, a sinker of the desired size and weight may be selected by rotating the knob 66 to bring the sinker into the notch 46 in substantially the position illustrated in Figure 1. Upon opening the jaws as suggested by the dotted lines in Figure 1, and moving the magazine 42 about the pivot 34 against the effort of the spring 68, the selected sinker S will be presented between the jaws 24 and 26 ready for clinching. Having previously placed a fishing line in the V-shaped notch in the sinker which has been selected, it will be evident that upon closing the jaws by advancing the handles 10 and 12 toward one another, the sinker will be closed about the fishing line. Upon withdrawing holding effort against the magazine, the spring 68 will return the magazine 42 to its initial position, and with the sinker S held between the clinching jaws 24 and 26, it will be extracted from its position between the fingers 56 and 58. When it is desired to remove a clinched sinker from a fishing line, the instrument is employed substantially as indicated in Figure 2 with the adjacent edges of the jaws 28 and 30 aligning with the split in the sinker S, and upon closing the jaws by advancing the handles 10 and 12 toward one another, it will be evident that the sharpened edges of the jaws 28 and 30 will enter the split in the sinker so as to open it and permit the extraction of the fishing line L from the opened slit.

While in the foregoing there has been shown and described the preferred form of this invention, it is to be understood that minor changes in the details of construction, combination and arrangement of parts may be resorted to without departing from the spirit and scope of the invention as claimed.

We claim:

1. In an instrument for closing and opening a split sinker on a fishing line, a pair of crossed handles pivotally connected together adjacent the intersection thereof, cooperating laterally projecting clinching jaws on the handles, the adjacent faces of said clinching jaws being knurled for gripping a split sinker and closing it about a fishing line, and sinker holding means pivotally carried by one of the handles for movement in an arc toward and away from the jaws to present an open sinker between the jaws for closure thereby.

2. In an instrument for closing and opening a split sinker on a fishing line, a pair of crossed handles pivotally connected together adjacent the intersection thereof, cooperating laterally projecting clinching jaws on the handles, the adjacent faces of said clinching jaws being knurled for gripping a split sinker and closing it about a fishing line, a magazine carried by the handle on the side of the instrument from which the jaws project, said magazine being movable in an arc toward and away from the jaws, and a means carried by the magazine for holding a group of open sinkers and presenting them one at a time between the jaws for closure thereby.

3. In an instrument for closing and opening a split sinker on a fishing line, a pair of crossed handles pivotally connected together adjacent the intersection thereof, cooperating laterally projecting clinching jaws on the handles, the adjacent faces of said clinching jaws being knurled for gripping a split sinker and closing it about a fishing line, a magazine carried by the handle on the side of the instrument from which the jaws project, said magazine being movable in an arc toward and away from the jaws, and a rotary carriage mounted in said magazine for holding a group of open sinkers and presenting them one at a time to the jaws for closure thereby.

4. In an instrument for closing and opening a split sinker on a fishing line, a pair of crossed handles pivotally connected together adjacent the intersection thereof, cooperating laterally projecting clinching jaws on the handles, the adjacent faces of said clinching jaws designed for gripping a split sinker and closing it about a fishing line, a magazine pivotally carried by the handle on the side of the instrument from which the jaws project, said magazine being movable in an arc toward and away from the jaws, a carriage mounted in said magazine to rotate about an axis which lies parallel to the axis about which the magazine moves and having yieldable pairs of fingers for holding a group of open sinkers and presenting them one at a time between the jaws for closure thereby.

5. In an instrument for closing and opening a split sinker on a fishing line, a pair of crossed handles pivotally connected together adjacent the intersection thereof, coperating laterally projecting clinching jaws on the handles, the adjacent faces of said clinching jaws being knurled for gripping a split sinker and closing it about a fishing line, sinker holding means carried by one of the handles for movement in an arc toward and away from the jaws to present an open sinker between the jaws for closure thereby, and yielding means carried by the handle carrying said sinker holding means and engaging said sinker holding means for moving said sinker holding means out of sinker presenting position and when the sinker is held by the clinching jaws.

RUSSELL G. BROWN.
KENNETH E. BROWN.

REFERENCES CITED

The following references are of record in the file of this patent:

UNITED STATES PATENTS

| Number | Name | Date |
|---|---|---|
| 319,775 | Barney | June 9, 1885 |
| 838,920 | Varnedoe | Dec. 18, 1906 |
| 1,126,324 | Weinstein | Jan. 26, 1915 |
| 1,290,331 | Partlow | Jan. 7, 1919 |
| 1,300,495 | Shank | Apr. 15, 1919 |
| 1,399,665 | Shapiro | Dec. 6, 1921 |
| 1,435,881 | Shough | Nov. 14, 1922 |